(12) United States Patent
Mori et al.

(10) Patent No.: US 8,440,267 B2
(45) Date of Patent: May 14, 2013

(54) METHOD OF MANUFACTURING LAMINATED BODY

(75) Inventors: Katsuhiro Mori, Shunan (JP); Junji Momoda, Shunan (JP); Naoto Takahashi, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 771 days.

(21) Appl. No.: 10/547,725

(22) PCT Filed: Mar. 4, 2004

(86) PCT No.: PCT/JP2004/002729
§ 371 (c)(1),
(2), (4) Date: Sep. 1, 2005

(87) PCT Pub. No.: WO2004/078364
PCT Pub. Date: Sep. 16, 2004

(65) Prior Publication Data
US 2006/0269663 A1 Nov. 30, 2006

(30) Foreign Application Priority Data

Mar. 5, 2003 (JP) .................................. 2003-058100
Jul. 23, 2003 (JP) .................................. 2003-200204

(51) Int. Cl.
*C08F 2/48* (2006.01)
(52) U.S. Cl.
USPC ........... 427/508; 427/162; 427/240; 427/487; 427/517
(58) Field of Classification Search ................... 427/240, 427/162, 487, 508, 517
See application file for complete search history.

(56) References Cited

U.S. PATENT DOCUMENTS 3,619,041 A * 11/1971 Willoughby .................. 430/261
4,081,492 A * 3/1978 Traenckner et al. .......... 525/531
4,495,015 A * 1/1985 Petcen ............................ 156/80

(Continued)

FOREIGN PATENT DOCUMENTS

EP   0 139 478 A1   5/1985
EP   1 535 980 A1   6/2005

(Continued)

OTHER PUBLICATIONS

Abstract, Patent No. WO 03/011967, published Feb. 13, 2003, Inventor: Momoda et al., entitled "Curable Composition, Cured Article Obtained Therefrom, and Photochromic Optical Material and Process for Producing the Same" (equivalent to US 2004-0220292).

(Continued)

*Primary Examiner* — Elena T Lightfoot
(74) *Attorney, Agent, or Firm* — The Webb Law Firm

(57) ABSTRACT

A process for efficiently forming a thick coating layer having a uniform thickness on the surface of a base material having a curved surface. The process comprises the steps of forming a coating film having a predetermined thickness by applying a coating agent containing a polymerizable monomer on the curved surface of a base material, and then curing the coating film in an atmosphere of an oxygen concentration of not more than 500 ppm by photo-polymerization while substantially maintaining the uniformity of the thickness of the coating film. Preferably, the photo-polymerization of the coating film is carried out while rotating the base material at a rotational speed of from 20 to 1500 rpm.

9 Claims, 6 Drawing Sheets

U.S. PATENT DOCUMENTS

| | | | |
|---|---|---|---|
| 4,679,918 A * | 7/1987 | Ace | 351/163 |
| 5,246,728 A | 9/1993 | Rodriguez | |
| 5,385,638 A * | 1/1995 | Isono et al. | 216/48 |
| 5,531,940 A * | 7/1996 | Gupta et al. | 264/1.7 |
| 5,733,483 A * | 3/1998 | Soane et al. | 264/1.7 |
| 5,920,418 A * | 7/1999 | Shiono et al. | 359/246 |
| 6,296,707 B1 | 10/2001 | Adamczyk et al. | |
| 6,602,603 B2 * | 8/2003 | Welch et al. | 428/412 |
| 6,998,072 B2 * | 2/2006 | Welch et al. | 252/586 |
| 2003/0044530 A1 * | 3/2003 | Morikawa et al. | 427/240 |
| 2004/0173782 A1 | 9/2004 | Nagoh et al. | |
| 2004/0220292 A1 | 11/2004 | Momoda et al. | |
| 2005/0116381 A1 * | 6/2005 | Wong et al. | 264/236 |
| 2006/0071203 A1 | 4/2006 | Mori et al. | |

FOREIGN PATENT DOCUMENTS

| | | |
|---|---|---|
| EP | 1 561 571 A1 | 8/2005 |
| EP | 1 568 739 A1 | 8/2005 |
| JP | 2000-037657 A | 2/2000 |
| JP | 2000-334369 A | 12/2000 |
| JP | 2004-012857 A | 1/2004 |
| WO | WO 98/11998 A1 | 3/1998 |
| WO | WO 01/02449 A2 | 1/2001 |

OTHER PUBLICATIONS

Patent Abstracts of Japan, Publication No. JP 04-043301, published Feb. 13, 1992, Inventor: Takami Manabu, entitled "Resin Coating Method for Optical Component".

Abstract, Japanese Patent No. JP 61-500105T, published Jan. 23, 1986, entitled "Improved Method for Overcoating Optical Recording Media" (equivalent to EP 0139478).

Abstract, European Patent No. EP1433814, published Jun. 30, 2004, Inventors: Momoda et al., entitled "Curable Composition, Cured Article Obtained Therefrom, and Photochromic Optical Material and Process for Producing the Same" (equivalent to US 2004-0220292).

* cited by examiner

METHOD OF MANUFACTURING LAMINATED BODY

TECHNICAL FIELD

The present invention relates to a process for preparing a laminate having a base material on which a surface coating layer is formed, for example, a plastic lens having a photochromic coating layer and the like.

TECHNICAL BACKGROUND

Photochromic spectacles are spectacles which lenses are quickly colored in an outdoor irradiated with light containing UV rays such as sunlight to function as sunglasses and which are discolored in an indoor irradiated with no such light to function as ordinary transparent spectacles, and demands thereto grow larger in recent years.

Known processes for producing plastic lenses having a photochromic property are a process in which lenses having no photochromic property are impregnated on surfaces with photochromic compounds (hereinafter referred to as an imbibition process), a process in which a photochromic compound is dissolved in a monomer and the monomer is polymerized to thereby directly obtain photochromic lenses (hereinafter referred to as an in mass process) and a process in which a coating agent (hereinafter referred to as a photochromic coating agent) comprising a photochromic compound is applied on the surfaces of plastic lenses to provide a layer (photochromic coat layer) having a photochromic property (hereinafter referred to as a coating process). Among these processes, the coating process has an advantage in that it can provide photochromic property to any lens base materials in principle, as compared with the other two processes. Besides, a soft base material in which a photochromic compound is liable to be dispersed has to be used as a base material for lenses in the imbibition process, and a specific composition has to be used as well in the in mass process in order to allow the good photochromic property to be revealed. However, the coating process does not have such restriction regarding base materials.

Examples of the photochromic coating agents used in the coating process may include a photo-polymerizable one (as disclosed in the pamphlet of WO-2001/02449). The present inventors also developed a photo-curable photochromic coating agent capable of providing a photochromic coating layer having excellent adhesion to a base material (as disclosed in the pamphlet of WO-2003/011967, Japanese Patent Application Nos. 2002-354291 and 2002-372835).

In order to form a photochromic coat layer using the photo-polymerizable photochromic coating agent, the coating agent is applied on the surface of a lens base material and thereafter, the coated film of the coating agent may be cured by irradiation with ultraviolet ray or other lights. However, it is not said still that the technique relating to the coating process has been accomplished. Even in the case of carrying out the curing as described above, a photo-curing apparatus for hard coating has been used.

As an apparatus of this kind, an apparatus capable of automatically carrying out a series of treatments from application of a coating agent to photo-polymerization is known. The apparatus has such a structure that a lens base material coated with the coating agent is automatically transported to a curing station where a light source for ultraviolet ray is equipped inside a cover and ultraviolet ray irradiation can be carried out while nitrogen gas is introduced into the cover (referred to JP-A-2000-334369).

It is considered that the coating process with the above apparatus may be a usable process as the process for preparing a photochromic plastic lens, however it has been found to have such problem that it is difficult to prepare a high quality photochromic coat layer by practically carrying out the coating with the photochromic coating agent. As one of the reasons, it is considered that the polymerization rate is lowered by light absorption of the photochromic compound contained in the coating agent and thereby it easily suffers polymerization inhibition due to residual oxygen in the polymerization atmosphere. In the case of preparing a lens having sufficient photochromic properties with the coating process, the thickness of the coat layer is necessary to be very thicker as compared with the thickness of the hard coat film (usually about 1 μm), for example, thicker than 5 μm, preferably thicker than 30 μm, since the concentration of the photochromic compound in the photochromic coating agent has a limit. Therefore, as another of the reasons, it is considered when the thickness of the layer is made to be large, the surface of the layer easily suffers the influence of polymerization hindrance caused by oxygen, while the deep part thereof slightly suffers the influence and thereby the polymerization degree is uneven in the thickness direction. Therefore, it is considered that the above problems may be solved by increasing the polymerization rate or carrying out the polymerization in an atmosphere substantially free from oxygen.

However, it is not preferred to increase the amount of a photo-polymerization initiator for preventing the polymerization rate from lowering because of inducing such a problem of lowering the durability of the photochromic compound. Furthermore, in the case of avoiding the problem of polymerization inhibition caused due to oxygen by sufficiently purging the atmosphere with an inert gas such as nitrogen gas, it takes a long period of time to lower the oxygen concentration into an unproblematic level by purging with an inert gas after disposing a base material coated with a coating agent in a polymerization apparatus. As the result, it is further found that the case of using a base material having a convex or concave curved surface such as lenses for spectacles causes different problems that even if the base material is horizontally stood, it is impossible to prepare a coating layer having an uniform and prescribed thickness because the coating agent is fluid, and the occurrence of color unevenness at the time of coloring and the lowering of optical properties of lenses are inevitable.

Under the circumstances, it is an object of the present invention to provide a process for forming a coat layer of a cured material made of a coating agent on the surface of a base material having a convex or concave curved surface such as lenses for spectacles or the like, and also to provide a process for uniformly and homogeneously curing a coating agent layer even if having a large thickness in an uncured state.

The present inventors have earnestly studied in order to solve the above problems. As a result, the present inventors have succeeded to carry out polymerization in a desired atmosphere for a very short period of time from the completion of the coating by using a photo-polymerization apparatus in which, in addition to a photo-polymerization chamber for carrying out photo-polymerization, a polymerization preliminary chamber is provided as a preceding chamber of the photo-polymerization chamber, while previously regulating the atmospheres of the both chambers, a base material coated with a photo-curable coating agent is once held in the polymerization preliminary chamber and then transferred to the photo-polymerization chamber by a specific transporting means. Furthermore, using the apparatus, various conditions for preparing the favorable coat layer have been variously studied and succeeded to specify the oxygen concentration capable of ignoring the influence of polymerization inhibition due to oxygen and the time capable of ignoring the deformation during a period of from the time just after the coating film formation to the time carrying out the polymerization curing. Thus, the present invention has been accomplished.

As a method for applying the coating agent on the surface of a lens base material, a method of using a spin coat apparatus (spin coat method) is known. The spin coat method comprises the steps of feeding a coat liquid (coating agent) on a lens base material rotationally held and then spreading the coat liquid over the base material surface by rotating the base material and further throwing excess coat liquid by rapidly rotating the base material and thereby regulating the desired film thickness. The spin coat method has been widely employed as a coating agent application process in forming a hard coat layer on the lens surface because of having the operation simplicity.

The case of using a photo-chromic coating agent with the spin coat method has the following specialties as compared with conventional spin coat methods.

Firstly, since it is necessary to give sufficient photo-chromic properties to a base material lens only by a photochromic coat layer in the coating method, the film thickness is necessary to be thick so as to be from 5 to 100 μm. In order to easily form the coating film having such a thickness, the photochromic coating agent is regulated to have a high viscosity of for example, a viscosity at 25° C. of from 20 to 1000 centipoises and also it is spread at a low rotational speed (as compared with the case of using conventional coating agents for hard coat) of, for example, not more than 1000 rpm.

Secondarily, the lens base material usually contains an ultraviolet absorbent. In the case that light transmitted through such a lens (light in which ultraviolet ray is decreased) is irradiated on the photochromic coat layer, it is difficult for the photochromic compound to develop coloring. Accordingly, in the case of preparing a photochromic lens with the above "coating method", it is necessary to form the photochromic coat layer on the surface of the lens front surface side (the surface opposite to the surface faced to the eyes when glasses are worn), usually the convexly curved surface.

However, when the photochromic coat liquid having a high viscosity is applied with spin coat on the lens surface, excess coat liquid, which has not been thrown off at the time of rapid rotation, stays in the periphery of the base material so that the thickness of the periphery of the photochromic coat layer is thicker than those of other parts (thickening of periphery) to cause problems such that the unevenness is induced in the thickness of the coat layer and the optical properties of the lens are lowered. This remaining liquid can fairly be decreased by removing the liquid staying in periphery of the base material by means of a jig such as a spatula or the like at the time of spin coat, but the thickening of the periphery cannot be dissolved completely.

In the case of lenses for spectacles, a lens subjected to coating is processed so as to fit the flame shape and then used. Therefore, since the periphery part where thickness is large (periphery thick part) is cut out in the processing, the lenses for spectacles practically do not have the above problems in many cases. However, the applications using lenses which are not subjected to cut processing still have the above problems. Furthermore even in the application of lenses for spectacles, when lenses having a small diameter are subjected to coating, the area of the thick periphery part becomes relatively large and the influence thereof cannot be ignored. Moreover, when flat-like lenses having a small curvature are subjected to coating, it has been found that the region of the thick periphery part is spread (occasionally, the region about 10 mm apart from the periphery in the radius direction becomes a thick periphery film part). In order to apply "the coating method" to lens base materials having various forms, it is necessary to further narrow the region of the thick periphery film part.

Under the circumstances, it is an object of the present invention to provide a process which does not cause periphery thickening when preparing products having a thick coating layer with a thickness, for example, from 5 to 100 μm, by spin coating method comprising applying a coating agent having a high viscosity such as a photochromic coating agent on the surface of a base material and then curing.

As described above, because the coating agent flows after the coating, the coating layer having a uniform thickness sometimes cannot be prepared. This problem will be probably solved by quickly curing the coating film after the coating film forming. But, in the case of carrying out the curing step in an atmosphere of an inert gas, the uniformity of the coating film thickness is occasionally deteriorated because it takes a certain time for gas purging. Therefore, in consideration of industrial preparation, the time for maintaining the uniformity of the coating film thickness is preferably longer.

As described above, it is another object of the present invention to provide a technique capable of maintaining the uniformity of the coating film thickness over a longer period of time after the coating film formation.

The present inventors have earnestly studied in order to solve the above objects. As a result, the present inventors found that during the time from formation of a coating agent-coated film with the spin coating method to curing thereof with light irradiation, the time of maintaining the uniformity of the coated film thickness can be prolonged by maintaining the base material at a low temperature, and also found that during this time, by rotating the base material at a specific rotational speed, the thick periphery film part is narrowed and the time capable of maintaining the uniformity of the coated film thickness can be more prolonged. Thus, the present invention has been accomplished.

SUMMARY OF THE INVENTION

The present invention for attaining these objects contains the following essentials.

(1) A process for preparing a laminate comprising a base material having a convex or concave curved surface and, on the surface, a covering layer having a thickness of from 5 to 100 μm, which process comprises the steps of:

forming a coating film having a predetermined thickness by applying a coating agent containing a polymerizable monomer on the curved surface of the base material, and then curing the coating film in an atmosphere of an oxygen concentration of not more than 500 ppm by photo-polymerization while substantially maintaining the uniformity of the thickness of the coating film.

(2) The process for preparing a laminate according to (1) wherein the coating agent comprises a photochromic compound.

(3) The process for preparing a laminate according to (1) or (2) wherein the base material has a circle or circle-like orthogonal projection configuration and has a curved surface to be coated with the coating agent, wherein a ratio ($\Delta h/r$) of a level difference $\{\Delta h(mm)\}$ on the convex or concave to a radius $\{r(mm)\}$ of the base material is from 0.01 to 0.50, the coating agent has a viscosity at 25° C. of from 20 to 1000 centipoises, and the coating film is cured by photo-polymerization in an atmosphere that the oxygen concentration is not more than 500 ppm within a period of passing the fluidization time (t) as defined below from the time just after the completion of application of the coating agent.

[Fluidization time (t)]: 50 μL of the coating agent is dropped on a predetermined position of a smooth surface of glass plate held horizontally at the temperature same as the temperature of the circumstances where the base material is held during a period of from just after completion of application of the coating agent to starting of curing the coating film. The coating agent is naturally spread until the spreading is completed. Thereafter, the glass plate is tilted so that the elevation angle to the horizontal is 30 degree and held, the time required that the endmost part of the periphery of the coating agent is moved by 10 mm just after the glass plate is tilted is taken as a fluidization time (sec).

(4) The process for preparing a laminate according to any one of (1) to (3) wherein the coating agent is applied in an atmosphere that the oxygen concentration is not less than 1%.

(5) The process for preparing a laminate according to any one of (1) to (3) wherein the coating agent has a viscosity at 25° C. of from 20 to 1000 centipoise, and after forming the coating film having a predetermined thickness on the base material, the coating film is cured by photo-polymerization while rotating at a rotational speed of from 20 to 1500 rpm along a rotation axis defined by a straight line which passes a center of the base material curved surface or a certain point near the center and also penetrates through the base material in the thickness direction.

(6) The process for preparing a laminate according to (5) wherein the formation of a coating film on the curved surface of the base material is carried out by a spin coat method and liquid stay of the coating agent caused in the periphery of the base material is removed during the spin coat.

(7) The process for preparing a laminate according to (5) or (6) wherein the cured coating film formed in the process has a thickness of from 5 to 100 μm.

DETAILED DESCRIPTION OF THE INVENTION

Figure 1:
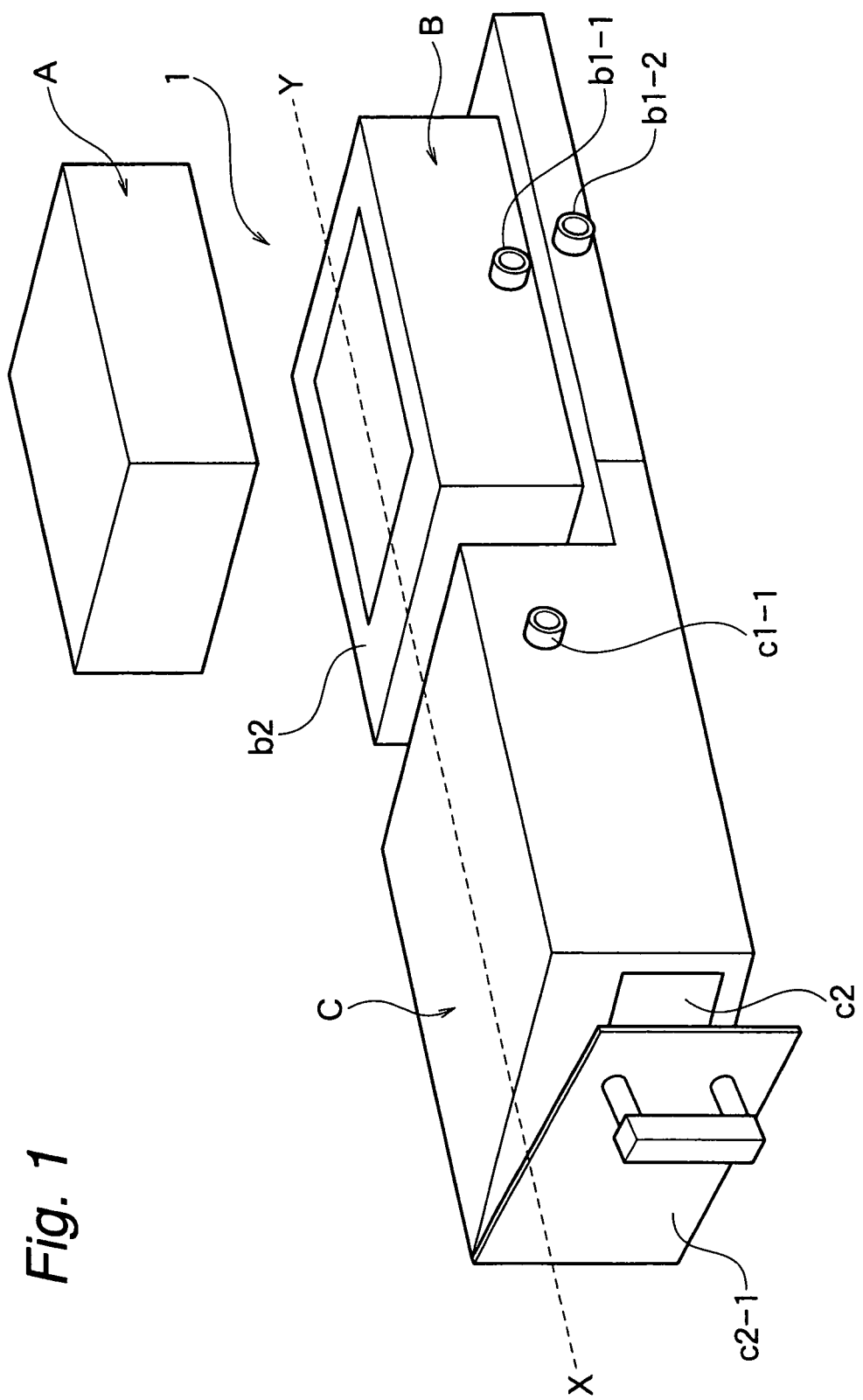
FIG. 1 is a perspective view showing a photo-polymerization apparatus 1 usable in the present invention.

The process for preparing a laminate according to the present invention comprises the steps of:

forming a coating film on the curved surface of the base material having a convexly or concavely curved surface, and then curing the coating film in an atmosphere that the oxygen concentration is not more than 500 ppm by photo-polymerization while substantially maintaining the uniformity of the thickness of the coating film.

The base material used in the present invention is not particularly limited as long as it has a convexly or concavely curved surface, and further, it preferably has a circle or circle-like form viewed from the up or down direction (orthogonal projection form) from the viewpoint of easily carrying out spin coating. Furthermore, from the view point of easily uniforming the thickness of the coating layer to be formed on the surface, the base material has a ratio ($\Delta h/r$) of a level difference $\{\Delta h(mm)\}$ on the convexly or concavely curved surface to be coated with the coating agent to a radius $\{r(mm)\}$ of the base material of from 0.01 to 0.50. The radius means ½ of the smallest diameter when the orthogonal projection form is circle-like. In the case that the base material has a convex surface, the level difference corresponds to the height of the highest point of the convex surface from the flat plane defined by the periphery of the base material, while in the case that the base material has a concave surface, the level difference corresponds to the height of the internal space which is formed by depositing the base material on the horizontally flat plane so that the concave surface is downward. Moreover, because it is highly useful to employ the process of the present invention, it is particularly preferred to use the base material having a diameter of from 50 to 150 mm and a curvature diameter on the main surface of not less than 50 mm.

The base material, which is not particularly limited, comprises any one of glasses, plastics, metals and ceramics. The base material made of the following materials can be used without particular limitation. Examples of the material may include plastic resins such as (meth)acrylic resin, polycarbonate resin, allyl resin, thiourethane resin, urethane resin, thioepoxy resin, polyethylene terephthalate, polypropylene, polyethylene, polystyrene, epoxy resin, polyvinyl chloride, polyethylene tetra fluoride, silicone resin and the like; metals such as stainless steel (SUS), aluminum, copper, iron and the like; rubbers such as styrene-butadiene rubber, polybutadiene rubber, isoprene rubber, acryl rubber and the like; and other known materials such as semiconductors, wood materials, inorganic glasses, quartz glasses, papers and ceramics. However, when the products prepared by the preparation process of the present invention are optical products, it is preferred to use a base material having transparency.

For example, in the case of preparing optical products such as photochromic lens and the like [in this case, the coating layer formed by the process of the present invention (hereinafter sometimes referred to "coating layer" simply) has photochromic properties], disk-like base materials made of glass or resin, which are used as a usual lens, are favorably used as the base material. In general, plastic glass lenses have a curved surface, and many lenses have a complex curved shape-having convex surface. In the present invention, such glass lenses can be used as the base material without any problems.

The base material subjected to surface treatments such as primer treatment, plasma treatment or corona discharge treatment may be used as the base material. Examples of such surface treatments may include chemical treatment with a basic aqueous solution or acidic aqueous solution, polishing treatment with a polishing agent and plasma treatment with atmospheric pressure plasma and low pressure plasma, and the like.

In the preparation process of the present invention, at first, on the convex or concave curved surface of the base material, a coating agent comprising a polymerizable monomer as an essential component is applied with a spin coat method or the like, to form a coating film having a thickness such that the cured thickness is an expected thickness. In this application, the coating agent is not particularly limited as far as it contains the polymerizable monomer as a component. However, the coating agent needs to have photo-polymerizable curing properties because the process is simple and when a resin base material is used as the base material, the base material is hardly deformed by heat or the like applied or generated at the curing time.

Furthermore, since the thickness of the finally resulting resin coat layer is easily regulated to be in the range of from 5 to 100 μm, the viscosity at 25° C. of the coating agent is from 20 to 1000 centipoises (cP). When the coating agent has a viscosity at 25° C. of less than 20 centipoises, the problem that the periphery of the film becomes thick, as described above, is not caused in the spin coating. On the other hand, when the coating agent has viscosity at 25° C. of over 1000 centipoises, it is difficult to perform the spin coating method. It is preferred to use the coating agent having a viscosity at 25° C. of from 50 to 500 centipoises, particularly of from 80 to 200 centipoises from the viewpoint of the effectiveness of the advantageous of the present invention and the operation properties.

As the components for constituting the coating agent, known compounds used in the applications of this kind can be used without particular limitation. The composition of the coating agent can be determined in accordance with the objects, for example, improvement of surface hardness, attaining photochromic properties, improvement of impact resistance, hard coat layer, antireflection layer or the like. For example, in the case of intending to improve the surface hardness, the composition preferably includes a monomer having at least three radically polymerizable groups and/or an organic-inorganic hybrid monomer, while, in the case of attaining photochromic properties, the composition preferably includes a radically polymerizable monomer in order to improve the chemical and mechanical properties of a cured product such as solvent resistance, hardness, heat resistance or the like, or the photochromic properties such as coloring density, color fading rate and the like. The radically polymerizable monomer is not particularly limited and it is possible to use known compounds having a radically polymerizable group such as (meth)acryloyl group, (meth)acryloyl oxy group, vinyl group, allyl group and styryl group, without any limitation. Among these, the compound having (meth)acryloyl group or (meth)acryloyl oxy group as a radically polymerizable group is preferable from the viewpoint of availability and excellent curing properties.

The coating agent used in the present invention may contain various kinds of additives such as a photochromic compound, a photo-polymerization initiator, an amine compound, a surface active agent, an antioxidant, a radical scavenger, a ultraviolet ray stabilizer, a ultraviolet ray absorbent, an antistatic agent, a fluorescent dye, a dye, a pigment, a perfume, a plasticizer, an organic solvent and the like, in accordance with the object for providing the coating layer or to improve the handling properties or the storage stability of the coating agent, and the stability of the coating layer. In the case of preparing a photochromic lens by the coating method, the various photochromic compounds such as a chromene compound, a fulgimide compound or the like are preferably used in a total amount of from 0.01 to 20% by weight, particularly 0.05 to 5% by weight.

Examples of the coating agents suitably usable in the present invention may include photo-polymerizable curing coating agents having a viscosity of from 20 to 1000 cP, particularly 50 to 500 cP, which comprise 0.001 to 5 parts by weight of the photo-polymerization initiator, 0.01 to 20 parts by weight, particularly 0.05 to 15 parts by weight of the photochromic compound based on 100 parts by weight of the radically polymerizable monomer. The coating agents contain a coating agent suitable in preparing the photochromic lens with the coating method disclosed by the present inventors in WO-A-03/011967 and Japanese Patent Application Nos. 2002-354291 and 2002-372835. Examples of the coating agents may include the following coating agents (1) to (4).

(1) The coating agent having a viscosity at 25° C. of from 100 to 140 cP, comprises 100 parts by weight of the polymerizable monomer composed of 5 parts by weight of γ-methacryloyl oxy propyl trimethoxysilane, 20 parts by weight of trimethylol propane trimethacrylate, 35 parts by weight of 2,2-bis (4-methacryloyl oxy ethoxy phenyl)propane, 10 parts by weight of polyester oligomerhexa-acrylate (Daicel UCB Co., Ltd. EB1830), 20 parts by weight of polyethylene glycol diacrylate having an average molecular weight of 532 and 10 parts by weight of glycidyl methacrylate, and 3 parts by weight of the following photochromic compound (I), 5 parts by weight of N-methyl diethanol amine, 5 parts by weight of bis(1,2,2,6,6-pentamethyl-4-piperidyl)sebacate and, as a photo-polymerization initiator, 0.4 part by weight of IRUGACURE 1800.

(2) The coating agent having a viscosity at 25° C. of from 110 to 150 cP, comprises 100 parts by weight of a polymerizable monomer composed of 1.5 parts by weight of 4,4'-diphenylmethane bismaleimide, 18.5 parts by weight of trimethylol propane trimethacrylate, 30 parts by weight of 2,2-bis(4-acryloyl oxy polyethylene glycolphenyl)propane having an average molecular weight of 776, 20 parts by weight of polyethylene glycol diacrylate having an average molecular weight of 532, 20 parts by weight of urethane oligomer hexa-acrylate and 10 parts by weight of glycidyl methacrylate, and further 3 parts by weight of the photochromic compound, 3 parts by weight of N-methyl diethanolamine, 5 parts by weight of bis(1,2,2,6,6-pentamethyl-4-piperidyl) sebacate and, as a photo-polymerization initiator, 0.5 part by weight of bis(2,4,6-trimethylbenzoyl)-phenyl phosphine oxide.

(3) The coating agent having a viscosity at 25° C. of from 90 to 130 cP, comprises 100 parts by weight of the polymerizable monomer composed of 10 parts by weight of γ-methacryloyl oxy propyl trimethoxysilane, 20 parts by weight of trimethylol propane trimethacrylate, 20 parts by weight of polyethylene glycol diacrylate having an average molecular weight of 532, 30 parts by weight of urethane oligomer hexaacrylate, 10 parts by weight of glycidyl methacrylate and 10 parts of hydroxypivalic acid neopentylglycohol diacrylate, and 3 parts by weight of the photochromic compound, 5 parts by weight of N-methyl diethanol amine, 5 parts by weight of bis(1,2,2,6,6-pentamethyl-4-piperidyl)sebacate and, as a polymerization initiator, 0.4 part by weight of bis(2,4,6-trimethylbenzoyl)-phenyl phosphine oxide.

(4) The coating agent having a viscosity at 25° C. of from 110 to 150 cP, comprises 100 parts by weight of the polymerizable monomer composed of 10 parts by weight of 2-isocyanate ethoxy methacrylate, 15 parts by weight of trimethylol propane trimethacrylate, 40 parts by weight of 2, 2-bis (4-methacryloyl oxy ethoxy phenyl)propane, 10 parts by weight of polyester oligomer hexa-acrylate (Daicel UCB Co., Ltd. EB1830), 15 parts by weight of polyethylene glycol diacrylate having an average molecular weight of 532 and 10 parts by weight of glycidyl methacrylate, and 3 parts by weight of the photochromic compound, 5 parts by weight of bis(1,2,2,6,6-pentamethyl-4-piperidyl)sebacate and, as a photo-polymerization initiator, 0.5 part by weight of IRUGACURE 1800.

In the process of the present invention, at first, the coating agent is applied on the main surface of the base material to form a coating film. As the method for applying the coating agent, conventionally known coating methods such as dipping method, spray method or the like can be used. Particularly it is preferred to use the spin coating method from the viewpoint of preparing a coating film having a uniform thickness with a simple procedure.

The spin coating method comprises the steps of feeding a prescribed amount of the coating agent (coat liquid) on the surface of a base material, rotating the base material along a rotation axis defined by a straight line which passes through the center of the main surface of the base material or a certain point near the center and penetrated through the base material in the thickness direction, and thereby spreading the coating agent on the base material surface to form a coating film having a uniform thickness. This method is generally employed in forming a coating film on the back surface of a lens having a concave surface (the surface faced to the eyes when glasses are worn) in the spectacle lens field and apparatuses used in the spin coating method have been commercially available. Such apparatus generally has a structure such that it comprises a means for base material holding and rotating which comprises a servo motor and a fixing adapter for holding the base material connecting with a rotation axis of the servo motor and a coating agent feeding means such as a dispenser or the like, and the coating agent is fed on the main surface of the base material fixed in the above means so that the main surface of the base material is exposed. The fixing adapter generally has a structure such that when a lens is disposed on the upper part of the adapter, the lens bottom surface and the adapter upper surface make a sealed space and also the space is passed through a passage to an outside exhaust device, and by reducing the pressure of the space, the lens disposed is held.

In the process of the present invention, the application with the coating agent can be carried out in the above procedure using the same apparatus. However, since the coating agent used herein has a high viscosity, it is difficult to apply the coating agent on the base material surface. Hence, in order to cleanly spread a small amount of the coating agent over all the surface of the base material, it is preferred to employ the following spin coating methods. One method comprises feeding the coating agent while moving a nozzle for feeding the coating agent to the radius direction of the base material with rotating the base material at a low rate, and thereby almost uniformly applying the coating agent on almost all of the base material surface. The another method using any spreading auxiliary means comprises feeding the coating agent to the vicinity of the center of the base material, allowing the coating liquid to contact with a flexible film in a bended state, moving the flexible film from the vicinity of the center part of the base material toward the periphery with rotating the base material and thereby spreading the coating agent on all the base material surface. Furthermore, in the time of spin coating, it is preferred to remove stagnant liquid caused in the periphery of the base material by contacting a jig such as a spatula or the like with the end of the base material in order that the region of the thick periphery is decreased and a uniform coating film can be prepared.

The thickness of the coating layer formed by the spin coat is necessary to correspond to the thickness of the finally resulting coating layer. By considering the shrinkage ratio at curing, depending on the kind of the coating agent used, the film thickness may be regulated by regulating the atmospheric temperature in the spin coat apparatus and the rotational speed and the rotation time of the base material. In the regulation, it is preferred to subject each coating agent used to preliminary experiment with changing the spin coat conditions and thereafter to examine the relation between each condition and the film thickness of the finally resulting coating layer. From the viewpoint of the large merit on the employment of the process of the present invention, the region of the finally resulting coating layer formed excluding the thick periphery part (for example, 80% of all the main surface of the center region excluding the periphery) has an average thickness of preferably from 20 to 80 μm, particularly 25 to 60 μm.

In the preparation process of the present invention, after forming the coating film as described above, it is necessary to cure the coating film by photo-polymerization with substantially maintaining the uniformity of the thickness of the coating film in an atmosphere that the oxygen concentration is not more than 500 ppm. Since the surface of the base material for forming the coating film is a convex or concave curved surface, when the coating film is allowed to stand after the coating film formation, the thickness of the coating film is changed by sagging of the coating agent (fluidity with the gravity thereof). Therefore, it is necessary to cure the coating film within the time that the film thickness is substantially unchanged by such phenomena. When photo-polymerization is carried out in an atmosphere that the oxygen concentration is over 500 ppm, the satisfactory resin coated layer cannot be prepared by the influence of polymerization inhibition caused by oxygen. Particularly, when the coating agent contains the photochromic compound, the polymerization rate is likely lowered by the light absorption function thereof. Therefore, the influence of the polymerization inhibition caused by oxygen becomes larger, so that the polymerization sometimes is not completed. Even if the polymerization is completed, since the thickness of the coating film is large and the polymerization rate is different on the surface layer part and the deep layer part of the coating layer, the resin coat layer having uniform properties cannot be prepared. From the viewpoint of the film thickness of the resin coat layer and the uniformity of the properties thereof, the oxygen concentration in the atmosphere in carrying out photo-polymerization is preferably not more than 300 ppm, particularly preferably not more than 100 ppm.

In the present invention, the description that the uniformity of the thickness of the coating film is substantially retained means the fact that in the region of the resin coat layer prepared by curing the coating film excluding the periphery part of the base material, when five points are designated along the line passed through the center of the base material with an almost same distance from the center to the periphery edge, the coefficient of variation CV of the film thickness of the resin coat layer at these points is not more than 3%, preferably not more than 2.5%. The region of the resin coated layer excluding the base material periphery part is a region which is inside by a prescribed distance from the periphery edge of the polymer film, and the area of the region is at least 70% of the area of all the laminate surface. The time from the formation of the coating film to the beginning of substantially changing the thickness of the coating film cannot be determined generally because the time varies depending to the shape of the base material used and the kind (particularly the viscosity) of the coating agent. However, in the case of using the base material having a circle or circle-like projection shape and a ratio ($\Delta h/r$) of a level difference on the convex or concave curved surface to be coated with the coating agent $\{\Delta h(mm)\}$ to a radius $\{r(mm)\}$ of the base material of from 0.01 to 0.50, and using the coating agent having a viscosity at 25° C. of from 20 to 100 cP, the thickness of the coating film does not substantially change during the passage of the fluidization time (t). Accordingly, when such base material and coating agent are used, it is preferred to cure the coating film with photo-polymerization in an atmosphere that the oxygen concentration is not more than 500 ppm within a period of the passage of the fluidization time (t) just after the completion of the spin coat.

The fluidization time (t) means a time (sec) defined in such a manner described below. That is, 50 μL of the coating agent is dropped on a predetermined position of a smooth surface of glass plate held horizontally at the temperature same as the temperature of the circumstances where the base material is held during a period of from just after completion of application of the coating agent to starting of curing the coating film. The coating agent is naturally spread until the spreading is completed. Thereafter, the glass plate is tilted so that the elevation angle to the horizontal is 30 degree and held, the time required that the endmost part of the periphery of the coating agent is moved by 10 mm from just after the glass plate is tilted is taken as a fluidization time (sec). The fluidization time has a tendency that the lower the measurement atmosphere temperature is, the longer the fluidization time is.

Therefore, during a period of from just after completion of application of the coating agent to starting of curing the coating film, it is desired to retain the base material on which the coating film has been formed under the circumstance that the temperature is not higher than room temperature, preferably from 5 to 20° C., particularly preferably 10 to 18° C.

The method for curing the coating film with photo-polymerization in an atmosphere that the oxygen concentration is not more than 500 ppm while substantially retaining the thickness of the coating film is not particularly limited, and for example, using an apparatus capable of carrying out the coating film formation and photo-polymerization in one sealed space, the photo-polymerization may be carried out just after the coating film formation while the oxygen concentration in the sealed space is maintained to be not more than 500 ppm. In the present invention, the curing of the coating film may be completed by photo-polymerization singly, or a method for completing the curing of the coating film by the combined use of thermal polymerization after the photo-polymerization may be employed. Examples of the thermal polymerization may include a method of thermally polymerizing with heat in a polymerization furnace, a method of curing by irradiating with infrared rays in a polymerization furnace and the like.

Furthermore, even in the case of carrying out the coating film formation with spin coat or the like in an atmosphere, the oxygen concentration in the polymerization atmosphere can be lowered to be not more than 500 ppm within a period that the thickness of the coating film does not substantially change by carrying out the polymerization using a photo-polymerization apparatus for curing the layer of the photo-polymerization curable coating agent formed on the surface of the base material, said photo-polymerization apparatus comprises:

a light source (A), a photo-polymerization chamber (B) which comprises an atosphere control means (b1) for controlling the chamber atmosphere, a ceiling (b2) having a light transmittance aperture (b2-1), an opening (b3) capable of taking-out and putting-in the base material held on a base material holding platform (S) capable of horizontally holding the base material in such a state that the layer of the photo-polymerizable coating agent is an upper surface, and an accommodating part (b4) for the base material holding platform capable of accommodating the base material holding platform which can hold the base material horizontally, and which chamber is used for curing the layer of the photo-polymerizable coating agent formed on the surface of the base material held on the base material holding platform accommodated in the accommodating part by the light incident from the light source through the light transmittance aperture, a polymerization preliminary chamber (C) for contemporarily holding the base material, which chamber comprises an atmosphere control means (c1) for controlling the inside atmosphere, an opening (c2) having a door (c2-1) with open and close function for taking-out and putting-in the base material or the base material holding platform on which the base material is held, between the inside of the apparatus and the outside thereof, an opening (c3) capable of taking-out and putting-in the base material holding platform on which the base material is held, which opening connects with the opening (b3) of the photo-polymerization chamber directly or through a passageway, and an accommodation part (c4) for a base material holding platform capable of accommodating the base material holding platform in such a state that the base material is held horizontally, and a base material transferring means (D) for transferring the base material holding platform on which the base material is held, between the base material holding platform accommodating part (b4) and the base material holding platform accommodating part (c4), while the base material is kept in a horizontal state. The apparatus has such function that the base material can be disposed in a desired atmosphere for a short period of time. When using the above apparatus there are such advantages that the application of the coating agent with the spin coat method can be carried out in an atmosphere that the oxygen concentration is not less than 1% and a commercially available spin coat apparatus can be used as is. Accordingly, in the preparation process of the present invention, it is preferred to use the above apparatus.

Figure 2:
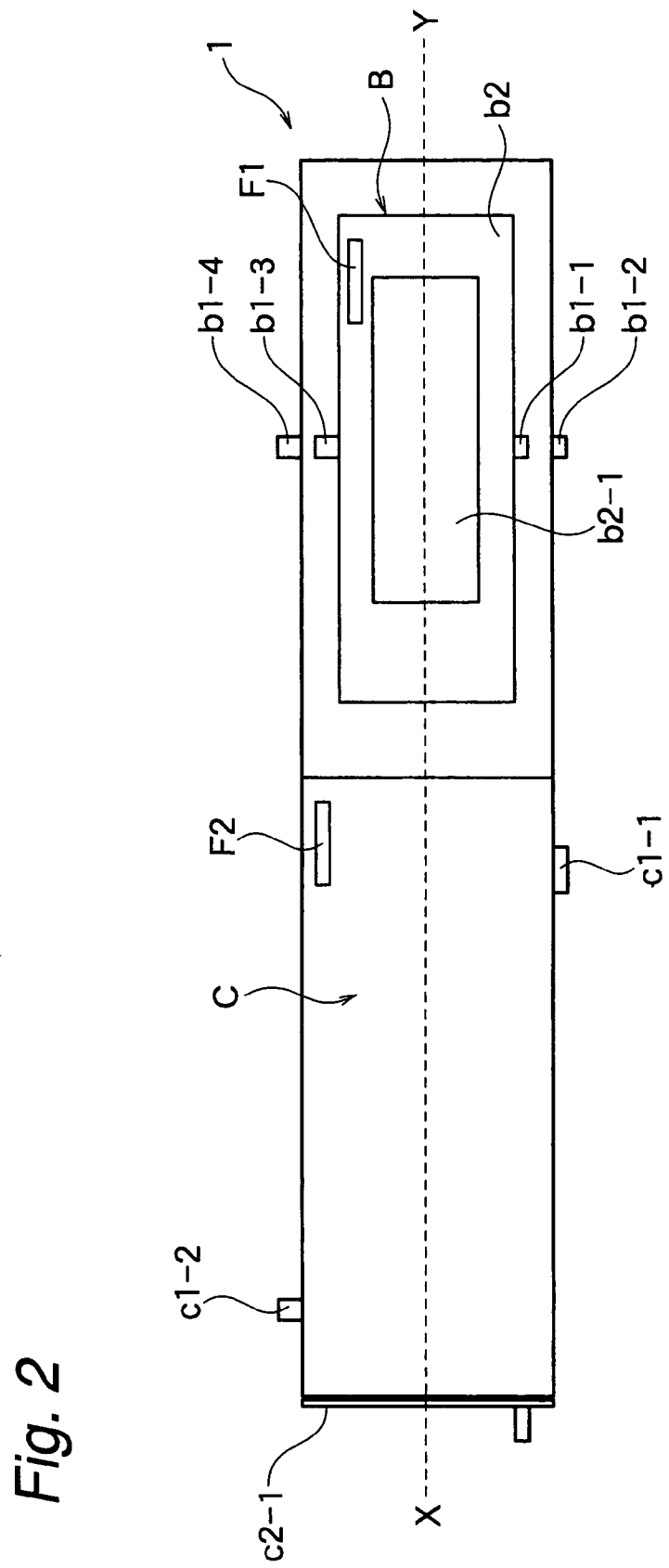
FIG. 2 is a plane view of the above apparatus (excluding a light source part).
Figure 3:
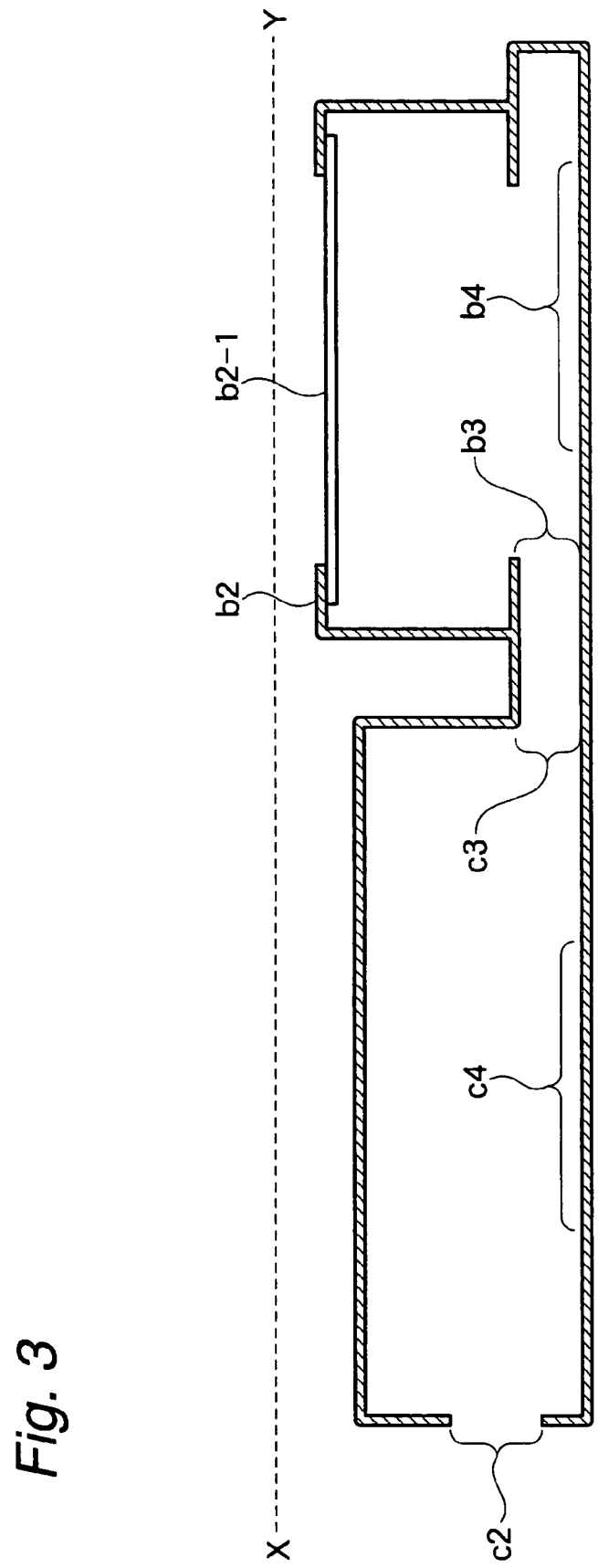
FIG. 3 is a cross section taken along X-Y axis in FIG. 1.

Hereinafter, the above typical photo-polymerization apparatus is explained with reference to drawings and the process for forming a coat layer using the apparatus in accordance with the process of the present invention is also described. The perspective view of the typical photo-polymerization apparatus 1 is shown in FIG. 1, the plane view (excluding a light source part) thereof is shown in FIG. 2 and the sectional view taken along X-Y axis is shown in FIG. 3.

As is shown in FIG. 1, the photo-polymerization apparatus 1 basically comprises a light source A, a photo-polymerization chamber B and a polymerization preliminary chamber C, and the photo-polymerization and the polymerization preliminary chamber each have, therein, a base material transferring means D capable of transferring the base material holding platform S on which a base material 2 is held in a horizontal state.

The light source A is held over the photo-polymerization chamber B by a holding means not shown at a position where light emitted from the light source A enters into the inside of the photo-polymerization chamber B through an aperture b2-1. The light source A is disposed outside of the photo-polymerization chamber B so that the light source can easily be maintained and also the volume of the photo-polymerization chamber can be diminished and further, the inside atmosphere can be controlled for a short period of time by a method such as nitrogen gas purging or the like.

The light source A is a source for generating light (active energy rays) such as ultraviolet rays caused by a non electrode lamp or the like and connects to an electric source and a control apparatus not shown. Furthermore, near the light source A, a blower may be disposed in order to cool the light source.

The holding means for holding the light source A is not particularly limited as long as the light source A can be fixed, and, for example, it is possible to employ a holding means for holding with an arm fixed on a support fixed in a support block. In the case that the holding means comprises a rotary screw stem substantially extended upwardly capable of rotationally driving by a motor or the like, and an arm having a hole for screwing with the screw stem, rotationally driving of the screw stem elevates and lowers the light source A fixed on the arm to regulate the position of the light source A.

As the light source A used in light irradiation, conventionally known light sources can be used without any limitation, the light source may be appropriately selected in consideration of the active wavelength or the like of a polymerization initiator used. In general, the discharge method of the light source is roughly classified into an electrode discharge light source and a non-electrode discharge light source by the way of emitting light. The former is a method of emitting light with a lamp by applying a voltage on an electrode, and the latter is a method of emitting light with a lamp by controlling energy of microwaves without the necessity of electrode. Any of the discharge light sources can be employed. Examples of the electrode discharge light source may include ozone-less high-pressure mercury lamp, ozone high-pressure mercury lamp, ultrahigh-pressure mercury lamp, high-pressure mercury lamp containing a halogenated metal such as halogenated iron or halogenated gallium, sterilized lamp, krypton arc lamp, carbon arc lamp, xenon lamp, tungsten lamp, metal halide lamp, indium lamp, thallium lamp and the like. Examples of the non-electrode discharge light source may include H bubble, H plus bubble, D bubble, V bubble, M bubble, Q bubble and the like. These light sources may be used singly in combination with two or more kinds without discrimination between the electrode discharge light sources and the non-electrode discharge light sources. Further, electron rays may be used as a light source and in this case, it is possible to cure the coating film without addition of the photo-polymerization initiator.

Moreover, in order to decrease the light volume of light emitted from the light source A or cut light having a specific wavelength region, a filter may be disposed between the light source and the base material. For example, it is possible to use a ultraviolet ray cut filter, hard soda glass or heat ray cut filter.

The photo-polymerization chamber B is a chamber having a ceiling b-2 wherein at least one part thereof is composed of an aperture b2-1 made of light transmitting material such as quartz, borosilicate glass, soda glass or the like, which may be subjected to rubbing processing. The photo-polymerization chamber B has, therein, a space for accommodating the base material holding platform S specifically described later, namely, the accommodating part b4 for the base material holding platform. The accommodating part is disposed at a position that in the case of emitting light from the light source A, light transmitted through the aperture b2-1 can irradiate the base material on which the coating film of the photo-polymerizable coating agent has been formed on the surface, held on the base material holding platform accommodated in the accommodating part. Furthermore, on the photo-polymerization chamber B, an opening b3 for taking-out or putting-in the base material holding platform S is provided and when the opening is closed, the chamber can be sealed.

The base material holding platform holding thereon the base material transferred in the photo-polymerization chamber B from the opening b3 is accommodated in the accommodating part b4 and then, the coating agent layer of the base material is cured by light irradiation. After the curing, the base material, which has been held on the base material holding platform, is transferred again through the opening b3 outside the chamber. By transferring the base material having been subjected to curing in this manner, the base material can be taken out outside the chamber without disturbing the chamber atmosphere, which has been regulated once, namely, without introducing the air containing oxygen into the chamber. In addition to the opening b3, the photo-polymerization chamber B may have an opening for taking out the base material or the base material holding platform held with the base material outside the apparatus, provided that the opening needs to have a sealing means capable of sealing the opening such as an on-off door, a detachable cap or the like. In this case, it is preferred to provide a means that prohibits entering of outer air into the chamber at the time of taking out the base material.

Moreover, the photo-polymerization chamber B has an atmosphere control means b1 for controlling the atmosphere inside the chamber, so that the atmosphere inside the chamber, specifically, the composition of the atmospheric gas can be controlled. The atmosphere control means b1 has a gas introducing means for introducing an inert gas into the chamber and an exhaust means for exhausting a gas in the chamber, specifically, it has a gas introducing hole b1-1 connecting to, through a conduit, a flow rate control device (not shown) and an inert gas cylinder or a inert gas tank (not shown), and a gas exhausting hole b1-2 for exhausting the gas outside the chamber. The gas introducing hole and the gas exhaust hole may be connected to an on-off valve or a check valve. The gas exhaust hole may optionally be opened through a conduit or be connected with a forced exhaust means such as vacuum pump or the like. Furthermore, in the photo-polymerization chamber B, preferably, a detector F1 for detecting the oxygen gas concentration in the chamber is provided.

In FIG. 1, the box-like photo-polymerization chamber is shown, but the shape of the photo-polymerization chamber is not particularly limited as long as it satisfies the above conditions and, for example, a cylindrical one maybe used. The material of the chamber is not limited as long as the aperture is made of a transmitting material, examples thereof may include metals such as stainless steel or the like and resins. In order to surely perform the atmosphere control in the chamber for a short period of time, it is preferred to use a material capable of giving strength enough to keep the chamber inside under reduced pressure or a pressurized state. With regard to the floor of the photo-polymerization chamber B, in the case of employing a specific base material transfer means referring to the base material transfer means D as described later, it is preferred to use a fluorine resin having low surface abrasion resistance as a material for constituting the surface layer part of the floor in order that the base material holding platform S easily slides.

The polymerization preliminary chamber C has an accommodation part c4 for a base material holding plafform capable of accommodating the base material holding platform on which the base material is kept horizontally, two openings and a ceiling, and can be sealed by closing the two openings. One of the two openings is an opening c2 capable of introducing or taking out the base material or the base material holding platform S on which the base material is held from the outside of the apparatus and an on-off door c2-1 capable of sealing the opening pertains to the opening. The other opening is an opening c3 connecting the opening b3 of the photo-polymerization chamber directly or through a passageway and having a size capable of entering or taking out the base material holding platform on which the base material is held. The photo-polymerization chamber B and the polymerization preliminary chamber C are connected to each other by the opening b3 and the opening c3, and are preferably separated by one or two or more removable or on-off separators E from the view point that when the base material is introduced into the polymerization preliminary chamber from the outside, the influence caused by change of the atmosphere in the chamber does not affect the atmosphere of the photo-polymerization chamber. The separators may be a pivotable vertical plate capable of turning on the both sides, or a slidable shutter. Furthermore, the separators may be united with the base material holding platform S as described later. The shape and the material of the polymerization preliminary chamber may be arbitrarily selected and basically, it may be the same as the photo-polymerization chamber.

The base material or the base material holding platform S on which the base material is held are introduced into the polymerization preliminary chamber C from the outside through the opening c2, and is temporally held in the chamber. Thereafter, the base material holding platform S on which the base material is held is introduced into the photo-polymerization chamber B through the openings c3 and b3 without passing the outside of the apparatus (without contacting with the air) and then the coating agent layer is cured by receiving light irradiation. After the curing, the base material having been subjected to curing is again passed through the reverse route and taken out from the apparatus. The introduction of the base material may be carried out by introducing only the base material and holding on the base material holding platform previously disposed in the polymerization preliminary chamber, or holding the base material on the base material holding platform outside the apparatus and introducing the base material together with the base material holding platform.

The polymerization preliminary chamber C is provided in order to put the coating film in an atmosphere substantially free from oxygen immediately after the formation of the coating film comprised of the photo-polymerizable coating agent on the base material to thereby cure the coating film under such atmosphere. For this purpose, the polymerization preliminary chamber C needs to have an atmosphere control means c1 for controlling the inside atmosphere thereof. As the atmosphere control means c1, it is possible to employ the same one as the above atmosphere control means b1. In FIG. 2, a gas introducing hole c1-1 and a gas exhaust hole c1-2 are shown as an example of the atmosphere control means c1.

The photo-polymerization chamber and the polymerization preliminary chamber in such a state that the both are separated are previously purged with an inert gas such as nitrogen or the like using the atmosphere control means b1 and c1, and then the base material is quickly introduced into the polymerization preliminary chamber. Thereafter, the base material is transferred to the photo-polymerization chamber immediately or after optionally exhausting oxygen unavoidably entered into the chamber at the introduction time to an unproblematic level through the atmosphere control means c1 so that the base material can be set in an atmosphere that the oxygen concentration is very low for a very short period of time.

The polymerization preliminary chamber C preferably has a detector F2 for detecting the oxygen gas concentration in the chamber. Using the detector, it can be confirmed that the oxygen concentration in the polymerization preliminary chamber has reached to such level that oxygen concentration in the photo-polymerization chamber does not vary to the problematic level even if the separation is opened and thereby the operation can be ensured and the variation in the quality of the resulting products can be decreased.

The photo-polymerization apparatus 1 has a base material transfer means D capable of transferring the base material holding platform S on which the base material 2 is held, between the base material holding platform accommodating part b4 and the base material holding platform accommodating part c4 while keeping the base material in a horizontal state. When the base material is not held horizontally during the transfer, favorable coating film cannot be prepared because the uncured coating agent sags. As the transfer means D, it is possible to employ known transfer means capable of satisfying the above conditions. Preferable examples thereof may include a belt conveyer and a dolly capable of controlling start, stop, transfer direction, transfer rate and the like from the outside, and a movable plate (tray) of sliding on the floor. Furthermore, depending on the arrangement of the polymerization preliminary chamber, the photo-polymerization chamber and the optional passageway, the base material can be also transferred in such a way that the floors of them are constructed by a part of a turntable and the turntable is rotated.

Figure 4:
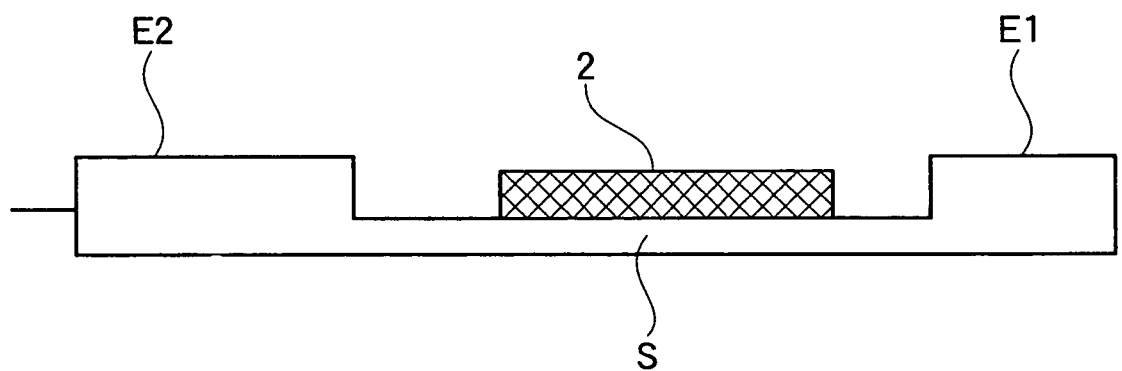
FIG. 4 is a preferred embodiment of a movable plate (tray) capable of sliding on a floor.

FIG. 4 shows a preferable embodiment of a movable plate (tray) of sliding on the floor, and the tray has a function as the base material holding platform S and a function as the separator E. Namely, the base material holding platform S (the above tray) as shown in FIG. 4 has a flat bottom surface and can slide on the floor surfaces of the polymerization preliminary chamber, the photo-polymerization chamber and passageway optionally disposed, and further, the base material 2 can be held on the upper part thereof (on the upper part, the concave part to fit the base material may be provided, not shown in the figures). The base material holding platform S has wall members E1 and E2 capable of functioning as the separator E on the former part (photo-polymerization chamber side) and the rear part (polymerization preliminary chamber side). The wall member E2 may have a handle for moving the base material holding platform S by hand or a rod d1, which freely moves backward and forward in a state that the wall of the polymerization preliminary chamber is sealed, and is capable of transferring the base material holding platform by a desired distance backward and forward by pushing or pulling the rod. FIG. 4 shows the movable tray having a plane bottom surface. Under the bottom surface, a wheel or bearing for improving the sliding properties may be provided, and the base material holding platform may be moved along with a guide for surely accommodating into the accommodation part, such as a guide groove or the like provided on the polymerization preliminary chamber, the photo-polymerization chamber and the optional passageway.

Figure 5:
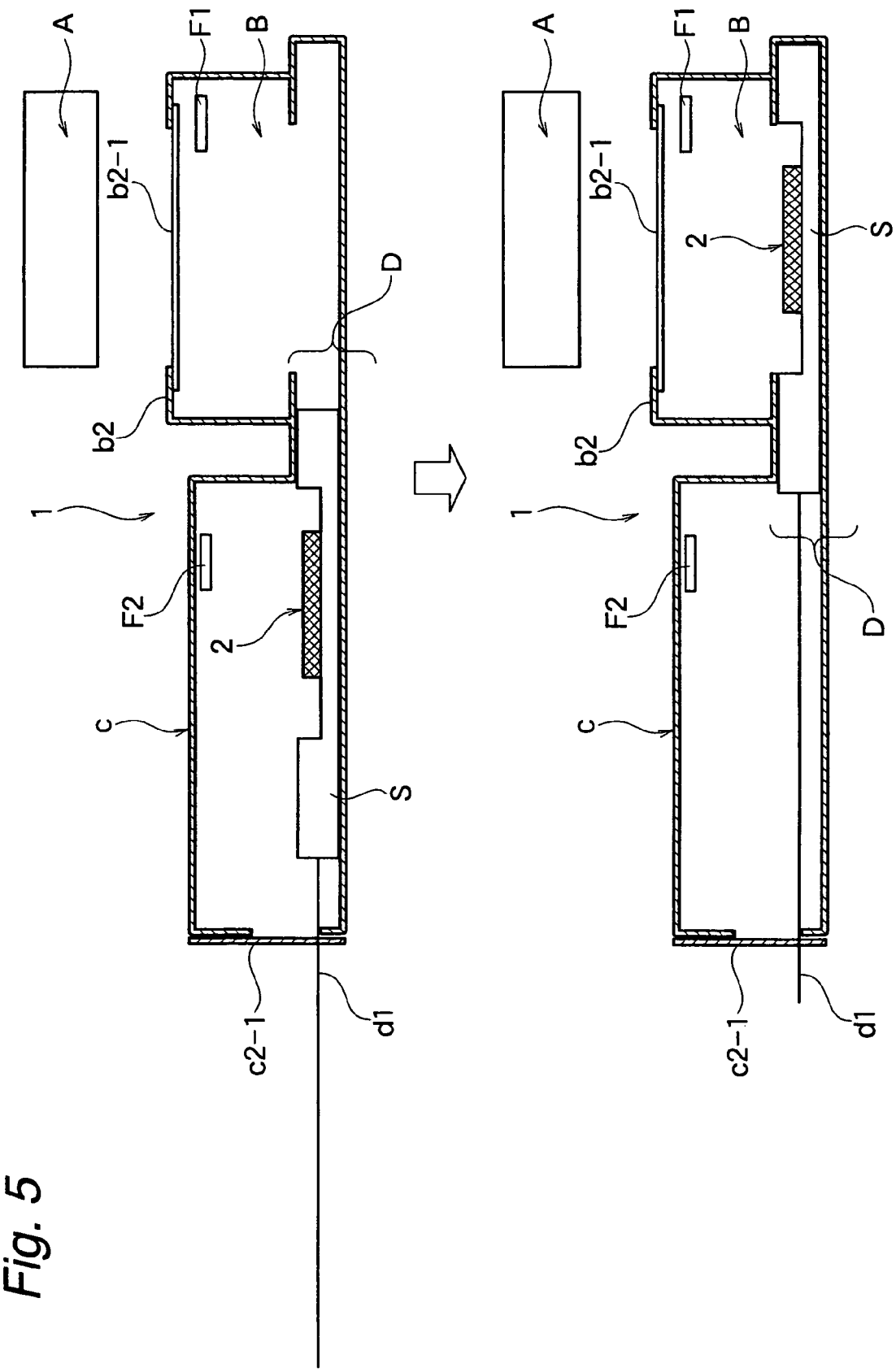
FIG. 5 is an embodiment of using a photo-polymerization apparatus.

Referring to FIG. 5, the base material transfer means using the base material holding platform S shown in FIG. 4 is described in more detail. The upper drawing of FIG. 5 shows such state that after the photo-polymerization chamber B and the polymerization preliminary chamber C are thoroughly purged with an inert gas such as nitrogen or the like (for example, until the oxygen concentration is not more than 300 ppm), the base material 2 coated with the coating agent is introduced from opening c2 and held on the base material holding platform S. Even before introducing the base material, the base material holding platform S is disposed at the position as shown in the view, and the wall member E1 separates the photo-polymerization chamber from the polymerization preliminary chamber. When the base material is introduced, oxygen enters from the outside by opening a gate c2-1, but the influence does not affect the photo-polymerization chamber because the photo-polymerization chamber is separated from the polymerization preliminary chamber. Furthermore, since the polymerization preliminary chamber has been purged with an inert gas previously, even if the amount of oxygen entered (which can be confirmed by the detector F2) is such a problematic level for carrying out polymerization as it is, the gate c2-1 is closed immediately after the base material is introduced, so that the absolute amount thereof is small. Therefore, even if the base material introduced in the polymerization preliminary chamber is immediately transferred to the photo-polymerization chamber, the influence exerted to the oxygen concentration in the photo-polymerization chamber can extremely be decreased. The transfer of the base material to the photo-polymerization chamber can be carried out by transferring the base material holding platform S into the photo-polymerization chamber B with forcing a rod d1. After the transfer, both of the chambers are separated by the wall member E2 of the base material holding platform. Furthermore, after the transfer, the oxygen concentration is confirmed just to make sure (optionally purging with the inert gas is further carried out for a short period of time), and then immediately, the coating agent layer on the base material surface may be cured with polymerization by irradiating light emitted from the light source A. Since the photo-polymerization chamber B is kept in a low oxygen concentration, the polymerization is not disturbed by oxygen, and since the time required from the coating film formation to the polymerization is short, it is possible to form a homogenous coat film having a uniform thickness.

As described above, the curing of the coating film is carried out quickly after the coating film formation so that the un-uniformity of thickness in the resin coat layer or the formation of a thick film part in the base material periphery can be decreased. However, when the curing step is carried out in an atmosphere of an inert gas, it takes a certain time to carry out gas purging. Therefore, in consideration of industrial operation, the time for keeping the uniformity of the coating film thickness is preferably longer.

In this demand, during a period of from just after the completion of the application of coating agent to beginning the curing of the coating film, the temperature of the environment in which the base material is held is kept to be low so that the fluidity of the coating film is lowered and thereby the time capable of keeping the uniformity of the coating film thickness is prolonged. Furthermore, in this process, the curing of the coating film is carried out while rotating the base material provided thereon the coating film, at the time of curing the coating film so that the time capable of keeping the uniformity of the coating film thickness can be prolonged although the resulting effect is less than the above.

That is, in the preparation process of the present invention, after forming the coating film of the coating agent, it is preferred to cure the photo-polymerizable composition on the base material by irradiating light in an atmosphere that the oxygen concentration is not more than 500 ppm while the base material is rotated at a rotational speed of from 20 to 1500 rpm along a rotating axis defined by a straight line which passes the center of the main surface of the base material or a certain point near the center and penetrates through the base material in the thickness direction. By rotating the base material at the time of the curing, the curing can be carried out with retaining excess coating agent (photo-curable liquid composition) forced into in the extremely narrow region of the periphery of the base material during the spin coating, and thereby the width of the thick periphery of the film can be narrowed and the uniformity of the coating film thickness can be maintained. In the case of employing the spin coat method as the method for coating with the coating agent, the above rotating axis is preferably same as the rotating axis at the time of the spin coating.

In the present invention, at the time of light irradiation with rotating the base material, the rotational speed should be in the range of from 20 to 1500 rpm. When the rotational speed is not more than 20 rpm, the donut-like liquid stay region is not sufficiently swept away into the periphery direction of the base material because the centrifugal force caused by the rotation is weak. When the rotational speed is over 1500 rpm, the flow to the periphery direction of the coating agent caused by centrifugal force is not ignored and thereby the film thickness regulated in a certain thickness at the time of the spin coat is largely changed or the apparatus is stained by the coating agent scattered. The rotational speed of the base material at the time of light irradiation may be determined within the above range of the rotational speed with taking consideration of the viscosity of the coating agent used and the required film thickness of the coating film, and it is preferably from 50 to 1000 rpm, particularly 100 to 600 rpm from the viewpoint of the effect. Furthermore, the above rotational speed is preferably lower than the rotational speed in the spreading of the coating film from the viewpoint of maintaining the film thickness regulated at the time of the spin coating.

In the present invention, while the base material is rotated, light irradiation is applied on the layer of the coating agent formed on the main surface of the base material to cure the layer. The time for beginning the rotation of the base material is not particularly limited as long as the coating agent does not disappear the fluidity by light irradiation. However, it is preferred to begin the rotation at the latest simultaneously or just before the beginning of the light irradiation from the viewpoint of the effect. In the case of applying the coating agent with the spin coat method, light irradiation may be carried out without stopping the rotation after the completion of the spin coating if the structure of the apparatus can fit the light irradiation.

Figure 6:
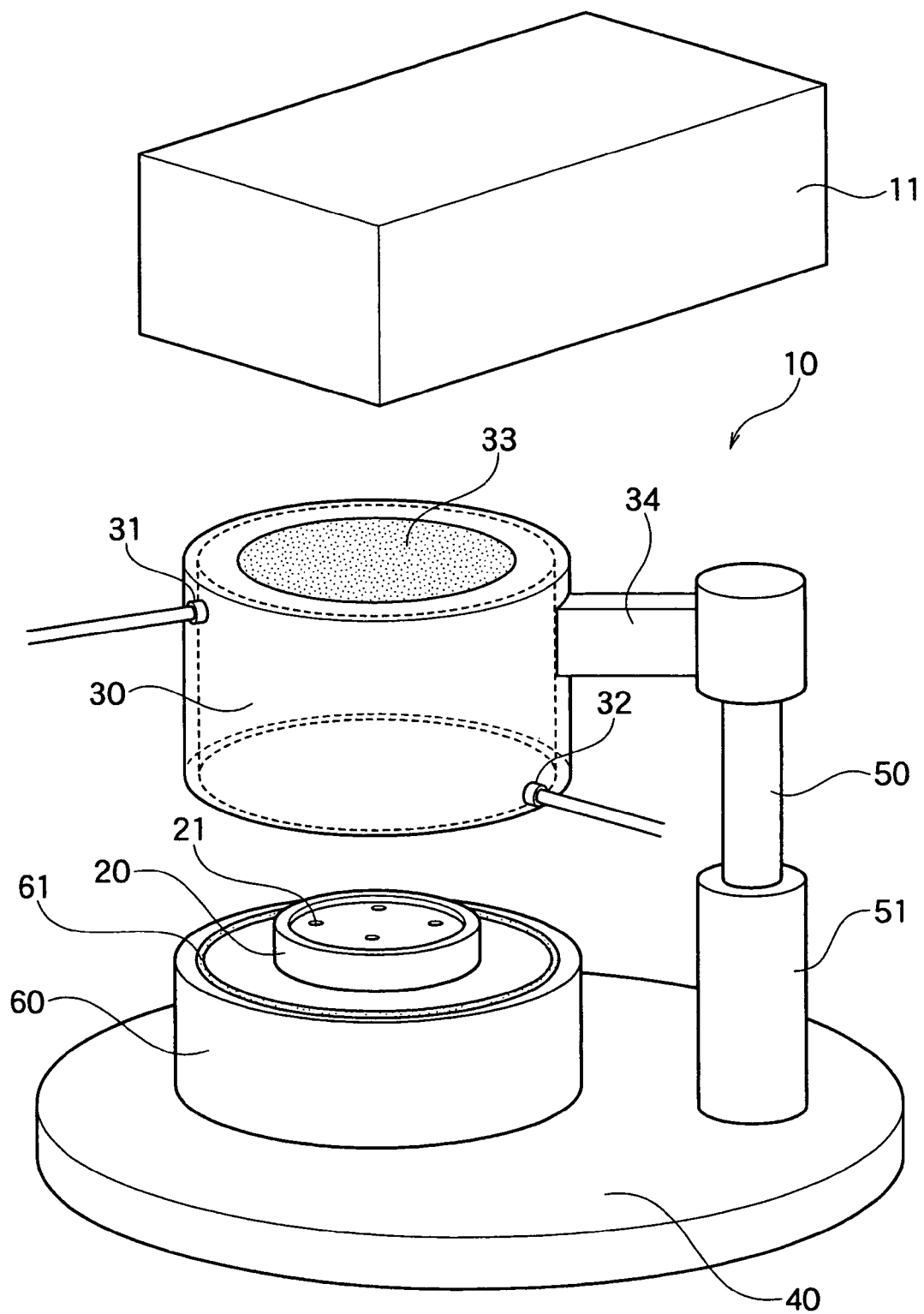
FIG. 6 is another embodiment of a photo-polymerization apparatus 10 usable in the present invention.

Referring the drawings, the photo-polymerization apparatus 10 capable of curing the coating film with rotating the base material is described below. FIG. 6 shows a perspective view of a typical photo-polymerization apparatus 10. The photo-polymerization apparatus 10 has a light source 11, a base material holding rotating part 20 and a cover 30. The base material holding rotating part 20 has a function capable of holding and rotating the base material for treatment such as glass lenses and the like and has such structure that when the base material is disposed on the upper part, the sealed space is made by the bottom surface of the base material and the upper surface of the base material holding rotating part. On the upper surface of the base material holding rotating part, vent holes 21 are provided and connect to an air pump not shown. Reducing the pressure of the sealed space with the air pump, it is possible to hold the base material mounted on the base material holding rotating part 20. The base material holding rotating part connects to a servomotor not shown and can rotate the base material mounted on the base material holding rotating part 20 with a rotation axis not shown as a center.

The cover 30 is held by an arm 34 connected to a support rod 50 provided on a supporting base 40, and can be transferred upward and downward along the support rod. The transfer of the cover is carried out by operating an air cylinder 51 connected to the support rod 50. On the supporting base 40, a cover supporting base 60 having upper surface thereon an O-ring 61 is provided, and when the cover 30 is descended, the O-ring 61 adheres to the bottom part of the cover and thereby the cover inside can be sealed. The cover 30 has a gas introducing port 31 and an exhaust port 32. A gas is introduced from the gas introducing port 31 and exhausted from the exhaust port 32 and thereby the atmosphere of the cover inside can be purged with the introduced gas. On the upper part of the cover 30, a glass made aperture plate 33 is fixed and through the aperture plate, UV light emitted from the upper light source 11 is irradiated inside the cover 30, and thereby the coating agent coated on the base material can be cured.

As described above, the photo-polymerization apparatus preferably used in the present invention is described on basis of the drawings, but the present invention should not be limited by the drawings of the photo-polymerization apparatus preferably used.

EXAMPLES

Hereinafter, the present invention will be described in more detail with reference to the following examples, however the present invention should not be limited by the examples.

Example 1

On the surface of a thiourethane resin made lens base material (plano-convex lens: degree 0.00, Δh/r=0.18), a photochromic coating agent having the following composition was applied by a spin coat method to form a coating film having a thickness of about 40 μm. Thereafter, using an apparatus as shown in FIG. 1, the coating film was cured in the following procedures (1) to (5) to prepare a plastic lens having a photochromic coat layer on the surface thereof (lens product). The procedures (3) and (4) were carried out at chamber temperature of 25° C. (the fluidization time "t" of the coating agent at chamber temperature of 25° C. was 10 sec).

The specifications of the photo-polymerization apparatus used herein are as follows.
A light source: A non-electrode UV lamp (F300SQ) manufactured by Fusion UV Systems.
B light polymerization chamber:
  Volume: about 4000 $cm^3$.
  Window material: Hard glass (boronsilicate glass)
  Atmosphere control means: A gas introducing hole capable of regulating the flow rate of a high purity nitrogen gas (oxygen concentration: not more than 5 ppm) in the range of from 250 to 350 $cm^3$/sec, and an exhaust hole.
  Oxygen concentration sensor: MKI-50SU manufactured by Osaka Oxygen Industries Ltd.
C polymerization preliminary chamber:
  Volume: about 14000 $cm^3$.
  Atmosphere control means: A gas introducing hole capable of regulating the flow rate of a high purity nitrogen gas in the range of from 250 to 350 $cm^3$/sec, and an exhaust hole.
  Oxygen concentration sensor: MKI-50SU manufactured by Osaka Oxygen Industries Ltd.
Composition of Photochromic coating agent
  γ-methacryloyloxypropyl trimethoxy silane: 10 parts by weight,
  trimethylol propane trimethacrylate: 15 parts by weight,
  polyester oligomer hexa-acrylate: 15 parts by weight,
  glycidyl methacrylate: 10 parts by weight,
  polyethyleneglycol diacrylate having an average molecular weight of 532: 10 parts by weight,
  2,2-bis(4-acryloyloxypolyethylene glycol phenyl)propane having an average molecular weight of 776: 40 parts by weight,
  N-methyldiethanol amine: 5 parts by weight,
  bis(1,2,2,6,6-pentamethyl-4-piperidyl)sebacate: 5 parts by weight,
  IRUGACURE 1800: a mixture of 1-hydroxycyclohexyl phenylketone with bis(2,6-dimethoxybenzyl)-2,4,4-trimethyl-pentyl phosphine oxide in a ratio of 3/1: 0.4 part by weight, and
  photochromic compound having the following formula: 2.5 parts by weight

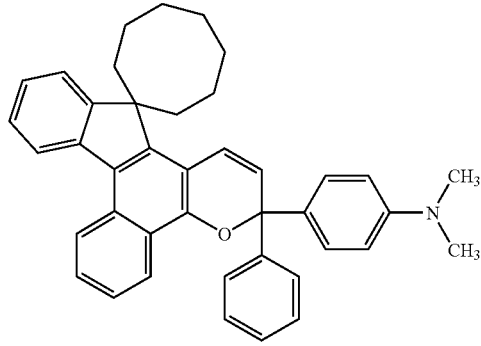 [SMILES: CN(C)c1ccc(C2(c3ccccc3)C=Cc3c4c(c5ccccc5c3O2)-c2ccccc2C42CCCCCCC2)cc1]

The photochromic coating agent has a viscosity at 25° C. of 113 cP.

Curing Procedure (1) At first, as the pre-treatment of a base material, the pre-treatment for the thiourethane resin made lens base material (plano-convex lens: degree 0.00 diameter about 70 mm) was carried out in an alkali aqueous solution.

(2) The polymerization preliminary chamber and the photo-polymerization chamber were purged with nitrogen by introducing nitrogen gas at a flow rate of 300 $cm^3$/sec. After it was confirmed that the oxygen concentration reached to 500 ppm or less, the above photochromic coating agent sufficiently mixed was applied on the lens base material having been subjected to the pre-treatment using a spin coater 1H-DX2 manufactured by MIKASA so that the film thickness was about 40 μm.

(3) The lens base material having thereon the formed photochromic coat layer was speedily transferred to the polymerization preliminary chamber and disposed on a base material holding platform previously set in the polymerization preliminary chamber. In this procedure, the oxygen concentration in the polymerization preliminary chamber was elevated to about 1 to 3%.

(4) After the lens base material was disposed on the base material holding platform, the base material holding platform was immediately transferred from the polymerization preliminary chamber to the photo-polymerization chamber, thereafter the polymerization chamber was purged with nitrogen for about 5 sec, and then the light source switch was turned on. In this time, the oxygen concentration in the photo-polymerization chamber was not more than 500 ppm, more specifically not more than 100 ppm, and the oxygen concentration was almost the same as that before the transfer of the base material holding platform. The time taken to transfer the lens base material after the completion of the spin coating to the photo-polymerization chamber was about 5 sec in total.

(5) The light irradiation was carried out for 3 minutes and then the base material was annealed at 120° C. for 1 hr and hence, a lens product was prepared.

With regard to the resulting lens product, the center part and the periphery part of the base material were evaluated on the film thickness of the coating layer and the photochromic properties by the following method (I) to (IV). The results were shown in Table 1.

(I) Film Thickness of Photochromic Layer:

To estimate the film thickness of the lens center part, a part having a film thickness of 110% or more as compared with the film thickness of the most central of the lens was excluded. Film thickness of the remaining coating layer was measured by using a thin film measuring apparatus manufactured by Filmetrics Co. For evaluating the uniformity of the film thickness, five points are designated along the line passed through the center of the base material with an almost same distance from the center to the position 5 mm apart from the periphery edge, and the film thickness at each of the five points was measured and thereby the coefficient of variation CV of the film thickness was determined (the area of the coating layer surface of the part excluding the inside region 5 mm apart from the periphery is about 72% of the area of all the coating layer surface). The film thickness of the lens periphery part was directly measured with observation using a power scope KH-2700 manufactured by Hilox Co.

(II) Maximum absorption wavelength ($\lambda$max): The resulting lens having the photochromic layer was irradiated with a xenon lamp L-2480 (300W) SHL-100 manufactured by Hamamatsu Photonics Co. through an aero-mass filter (manufactured by Corning Co.) at a temperature of 20° C.±1° C. at a beam intensity on the polymer surface of 365 nm=2.4 mW/cm², 245 nm=24 µW/cm² for 120 sec to develop color. In this irradiation, the maximum absorption wavelength was determined by a spectrophotometer (instantaneous multi-channel photo detector MCPD 1000) manufactured by Otsuka Electron Industries. The maximum absorption wavelength relates to the color tone at the time of color development.

(III) Coloring Density:

The difference between the absorbance $\{\epsilon(120)\}$ at the maximum absorption wavelength after the light irradiation for 120 sec and the absorbance $\{\epsilon(0)\}$ at same wavelength of the cured product without light irradiation $\{\epsilon(120)-\epsilon(0)\}$ was determined and taken as the coloring density. It is said that the higher the coloring density is, the more excellent the photochromic properties are.

(IV) Color Unevenness:

The resulting lens product was exposed to sunlight outside to develop the color. When the coloring density was stable, the unevenness of the coloring density in the region excluding the lens periphery part was evaluated visually.

A: The coloring unevenness was not observed at all.
B: The coloring unevenness was somewhat observed.
C: The coloring unevenness in the coloring density was clearly observed.

Comparative Example 1

A specimen was prepared in the same manner as in Example 1 except that the curing procedure was carried out in the following manner, and the specimen was evaluated in the same manner as in Example 1. The evaluation results are shown in Table 1.

Curing Procedure (1) The process was carried out in the same manner as the process (1) in Example 1.

(2)' On the lens base material subjected to the pre-treatment, the photochromic coating agent sufficiently mixed was applied using a spin coater 1H-DX2 manufactured by MIKASA Co., so that the film thickness was 40 µm. During the coating, the polymerization preliminary chamber and the photo-polymerization chamber were not purged with nitrogen and the both chambers were kept at an atmosphere of the air.

(3)' The lens base material having thereon the formed photochromic coat layer was speedily transferred to the polymerization preliminary chamber and disposed on the base material holding platform previously set in the polymerization preliminary chamber.

(4)' After the lens base material was disposed in the base material holding platform, the base material holding platform was immediately transferred from the polymerization preliminary chamber to the photo-polymerization chamber. Thereafter, the polymerization chamber was purged with nitrogen for 240 sec and then the light source switch was turned on. In this time, the oxygen concentration in the photo-polymerization chamber was 400 ppm. The flow rate of nitrogen gas was 300 cm³/sec.

(5) The process was carried out in the same manner as the process (5) in Example 1.

Examples 2 and 3

In each example, a specimen was prepared in the same manner as in Example 1 except for using nitrogen gas having an oxygen concentration of 100 ppm (Example 2) or 500 ppm (Example 3), and the specimen was evaluated in the same manner as in Example 1. The evaluation results are shown in Table 1.

Comparative Example 2

A specimen was prepared in the same manner as in Example 1 except for using nitrogen gas having an oxygen concentration of 1000 ppm. However, since the oxygen concentration was as high as 1000 ppm, the surface layer of the photochromic layer was dissolved in a solvent such as acetone or the like and thereby a lens, which was polymerized insufficiently, was prepared. Hence this lens was un-polymerized, the evaluation thereof was not carried out.

Comparative Examples 3 and 4

In each example, a specimen was prepared in the same manner as in Example 1 except for carrying out the nitrogen purging after transfer of the lens base material to the photo-polymerization chamber for 30 sec (Comparative Example 3) or 60 sec (Comparative Example 4) in the process (4) of the curing procedures disclosed in Example 1, and the specimen was evaluated in the same manner as in Example 1. The evaluation results are shown in Table 1.

As is clear from the results of Examples 1 to 3, it is confirmed that when the nitrogen purging is carried out so that the oxygen concentration is not more than 500 ppm, before the beginning of the photo-polymerization, a lens having photochromic coating layer of a comparatively uniform thickness and the uniform photochromic properties can be obtained. On the contrary, as is clear from Comparative Examples 1, 3 and 4, when the nitrogen purging is begun after the photochromic coating agent is applied on the lens base material, it takes a long period of time to decrease the oxygen concentration to the level that the polymerization can be begun. Therefore, the film thickness of the photochromic layer is uneven and sufficient photochromic properties cannot be obtained. Further, as is clear from Comparative Example 2, when photo-polymerization is carried out at an atmosphere that the oxygen concentration is 1000 ppm, the photochromic layer is insufficiently cured and un-polymerized.

Example 4

A specimen was prepared in the same manner as in Example 1 except that the curing procedure was carried out in the following manner using the apparatus as shown in FIG. 6, and the specimen was evaluated in the same manner in Example 1. The processes (2)" to (4)" were carried out controlling the chamber temperature to be 15° C. (the fluidization time "t" of the coating agent at a temperature of 15° C. was 20 sec). The evaluation results are shown in Table 1.

Curing Procedure

TABLE 1

| | Fluidization time (sec) | Holding time (sec) *1 | Oxygen Concentration (ppm) *2 | λmax (nm) | Coloring density | Coloring unevenness | Thick film part 1 (mm) *3 | Thick film part 2 (mm) *4 | Film thickness (μm) *5 | | | |
|---|---|---|---|---|---|---|---|---|---|---|---|---|
| | | | | | | | | | Center part | Periphery part | Periphery part-center part | CV (%) |
| Ex. 1 | 10 | 10 | 80 | 610 | 1.03 | A | 1.8 | 3.5 | 41 | 50 | 9 | 1.2 |
| Ex. 2 | 10 | 10 | 130 | 610 | 0.95 | A | 1.5 | 3.3 | 40 | 50 | 10 | 1.1 |
| Ex. 3 | 10 | 10 | 500 | 610 | 0.98 | A | 1.7 | 3.6 | 41 | 49 | 8 | 1.2 |
| Ex. 4 | 20 | 18 | 300 | 610 | 0.94 | A | 1.5 | 2.3 | 39 | 86 | 47 | 1.1 |
| Ex. 5 | 20 | 18 | 300 | 610 | 0.93 | A | 2.1 | 2.7 | 39 | 82 | 43 | 1.4 |
| Ex. 6 | 20 | 18 | 300 | 610 | 0.96 | A | 3.3 | 4.7 | 40 | 53 | 13 | 2.0 |
| Compar. Ex. 1 | 10 | 245 | 60 | 610 | 0.72 | C | 7.3 | 8.5 | 28 | 55 | 27 | 7.2 |
| Compar. Ex. 2 | 10 | 10 | 1000 | — | — | — | — | — | — | — | — | — |
| Compar. Ex. 3 | 10 | 35 | 70 | 610 | 0.87 | B | 3.8 | 5.4 | 36 | 53 | 17 | 3.5 |
| Compar. Ex. 4 | 10 | 65 | 60 | 610 | 0.82 | C | 5.1 | 6.9 | 32 | 52 | 20 | 5.1 |

*1 The time taken from the completion of the coating agent application to the beginning of the polymerization.
*2 The oxygen concentration of the atmosphere at the time of beginning polymerization.
*3 The width of thick periphery part having a film thickness larger than by 10% or more of the thickness of the center part, which is indicated by a distance from the edge of the base material.
*4 The width of thick periphery part having a film thickness larger than by 5% or more of the thickness of the center part, which is indicated by a distance from the edge of the base material.
*5 The film thickness in each of the center part and the periphery part is shown by an average determined by measuring at three points in each part.

(1) The process was carried out in the same manner as the process (1) in Example 1.

(2)" On the lens base material subjected to the pre-treatment, the photochromic coating agent sufficiently mixed was applied using a spin coater 1H-DX2 manufactured by MIKASA so that the film thickness was 40 μm. During the coating, nitrogen introduction at a flow rate of 20 L/min was begun from a gas introducing port 31 of the photo-polymerization apparatus 10 as shown in FIG. 6.

(3)" The lens base material having thereon the formed photochromic coat layer was speedily disposed on the base material holding rotational part 20 of the photo-polymerization apparatus 10 and a cover 30 was descended to seal the cover and then the purging in the atmosphere was started.

(4)" Using an air pump not shown, the lens base material was closely attached on the base material holding rotational part and after 10 sec from the start of nitrogen purging, the base material was rotated at a rotational speed of 150 rpm and then after 15 sec from the start of nitrogen purging, the switch of a light source 11 (non-electrode UV lamp (F300SQ) manufactured by Fusion UV Systems) was turned on. At this time, the oxygen concentration of the inside of the cover 30 was 300 ppm. It took 18 sec from the completion of the spin coat until the beginning of the light irradiation.

(5) The process was carried out in the same manner as the process (5) in Example 1.

Example 5

A specimen was prepared in the same manner as in Example 4 except for using a lens base material having a ratio Δh/r of 0.06, and the specimen was evaluated in the same manner as in Example 4. The evaluation results are shown in Table 1.

Example 6

A specimen was prepared in the same manner as in Example 5 except that nitrogen purging and photocuring were carried out without rotating the lens base material, and the specimen was evaluated in the same manner as in Example 5. The evaluation results are shown in Table 1.

According to the preparation process of the present invention, it is possible to efficiently form a thick coating layer on the surface of a base material having a curved surface. Furthermore, the coating layer prepared herein has a wide region that the thickness is uniform. Therefore, the preparation process of the present invention is particularly preferably used for the preparation of glass lenses.

The invention claimed is:
1. A process for preparing a laminate comprising a base material having a convex or concave curved surface and, on the surface, a covering layer having a thickness of from 25 to 60 μm, and having a coefficient of variation of the thickness of 3% or less at a central region which is inside a periphery edge of the covering layer by a prescribed distance and covers 70% of the base material surface, which process comprises the steps of:
  providing a coating agent consisting of a radically polymerizable monomer, a photochromic compound a photo-polymerization initiator and optionally at least one additive selected from the group consisting of an amine compound, a surface active agent, an antioxidant, a radical scavenger, an ultraviolet ray stabilizer, an ultraviolet ray absorbent, an antistatic agent, a fluorescent dye, a dye, a pigment and a perfume;
  determining a fluidization time (t) of said coating agent prior to applying said coating agent on the curved surface of the base material by
  dropping 50 μL of the coating agent on a predetermined position of a smooth surface of glass plate held horizontally at the same temperature as the temperature of the environment where the base material is held during a period of from just after completion of application of the coating agent to starting of curing the coating film; naturally spreading the coating agent until the spreading is completed; thereafter, tilting the glass plate so that the elevation angle to the horizontal is 30 degree and held; and taking as a fluidization time (sec) the time required for the endmost part of the periphery of the coating agent to move by 10 mm just after the glass plate is tilted;

forming a coating film having a predetermined thickness by applying the coating agent on the curved surface of the base material; and then curing the coating film in an atmosphere of an oxygen concentration of not more than 500 ppm by photo-polymerization while substantially maintaining the uniformity of the thickness of the coating film, wherein the coating agent is a photo-curing coating agent having a viscosity at 25° C. of from 50 to 500 centipoises, and wherein, based on 100 parts by weight of the radically polymerizable monomer, the photo-polymerization initiator is present in an amount of 0.001 to 5 parts by weight and the photochromic compound is present in an amount of 0.05 to 15 parts by weight, wherein the formation of the coating film on the curved surface of the base material is carried out by a spin coat method in which the base material is rotated at a rotational speed of not more than 1,000 rpm along a rotation axis defined by a straight line which passes through a center of the curved surface or a point near the center of the curved surface and also penetrates through the base material in the thickness direction, and wherein during a period of from just after the completion of applying the coating agent on the base material until beginning the curing of the coating film, the base material is held in an environment having a temperature controlled so that said curing of the coating film is started within a period of time that is not longer than the predetermined fluidization time (t) from the time just after the completion of application of the coating agent.

2. The process for preparing a laminate according to claim 1 wherein the base material has a circle or circle-like orthogonal projection configuration and has a curved surface to be coated with the coating agent having a ratio ($\Delta h/r$) of a level difference $\{\Delta h(mm)\}$ on the convexly or concavely curved surface to a radius $\{r(mm)\}$ of the base material of from 0.01 to 0.50.

3. The process for preparing a laminate according to claim 1 wherein the coating agent is applied in an atmosphere having an oxygen concentration of not less than 1%.

4. The process for preparing a laminate according to claim 1 wherein after forming the coating film having a predetermined thickness on the base material, the coating film is cured by photo-polymerization while rotating at a rotational speed of from 100 to 600 rpm along the rotation axis.

5. The process for preparing a laminate according to claim 4 wherein liquid stay of the coating agent in the periphery of the base material is removed during the spin coat.

6. The process for preparing a laminate according to claim 4 wherein a cured coating film formed in the process has a thickness of from 25 to 60 μm.

7. The process for preparing a laminate according to claim 2 wherein the coating agent is applied in an atmosphere having an oxygen concentration of not less than 1%.

8. The process for preparing a laminate according to claim 5 wherein a cured coating film formed in the process has a thickness of from 25 to 60 μm.

9. The process for preparing a laminate according to claim 1, wherein the base material is a lens.

* * * * *

UNITED STATES PATENT AND TRADEMARK OFFICE
CERTIFICATE OF CORRECTION

PATENT NO. : 8,440,267 B2
APPLICATION NO. : 10/547725
DATED : May 14, 2013
INVENTOR(S) : Katsuhiro Mori et al.

It is certified that error appears in the above-identified patent and that said Letters Patent is hereby corrected as shown below:

In the Claims:

Column 24, Line 48, Claim 1, after "compound" insert -- , --

Column 24, Line 49, Claim 1, after "initiator" insert -- , --

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,440,267 B2  Page 1 of 1
APPLICATION NO. : 10/547725
DATED : May 14, 2013
INVENTOR(S) : Mori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 868 days.

Signed and Sealed this
Eighth Day of September, 2015

Michelle K. Lee
*Director of the United States Patent and Trademark Office*